US009553924B1

(12) United States Patent
Duzett

(10) Patent No.: US 9,553,924 B1
(45) Date of Patent: Jan. 24, 2017

(54) LOAD SHARING AMONG LOOSELY COUPLED OR INDEPENDENT VIDEO SERVERS

(75) Inventor: Robert C. Duzett, Hillsboro, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 543 days.

(21) Appl. No.: 13/495,526

(22) Filed: Jun. 13, 2012

Related U.S. Application Data

(60) Provisional application No. 61/496,438, filed on Jun. 13, 2011.

(51) Int. Cl.
*H04L 1/00* (2006.01)
*H04L 29/08* (2006.01)

(52) U.S. Cl.
CPC ....... *H04L 67/1002* (2013.01); *H04L 67/1029* (2013.01)

(58) Field of Classification Search
CPC ............ H04L 65/4084; H04L 67/1002; H04L 67/1012; H04L 67/1029; H04L 67/1031; H04N 21/2181; H04N 21/23103; H04N 21/2405; G06F 2209/5014
USPC ........................................................ 709/226
See application file for complete search history.

(56) References Cited

U.S. PATENT DOCUMENTS

| | | | |
|---|---|---|---|
| 6,904,449 B1* | 6/2005 | Quinones | G06Q 10/10 709/203 |
| 7,487,531 B1* | 2/2009 | Vogel | H04N 7/165 709/239 |
| 8,065,560 B1* | 11/2011 | Patil | 714/14 |
| 8,392,748 B2* | 3/2013 | Bocharov | H04N 21/23116 709/217 |
| 8,479,242 B1* | 7/2013 | Chen | H04N 21/23103 725/93 |
| 8,595,377 B1* | 11/2013 | Apgar | H04N 7/181 348/143 |
| 8,793,529 B2* | 7/2014 | Lee | G06F 9/5083 709/223 |
| 2003/0051187 A1* | 3/2003 | Mashayekhi et al. | 714/4 |
| 2004/0010588 A1* | 1/2004 | Slater et al. | 709/224 |
| 2004/0153407 A1* | 8/2004 | Clubb | G06Q 40/02 705/41 |
| 2004/0181688 A1* | 9/2004 | Wittkotter | G06F 21/10 726/26 |
| 2007/0027916 A1* | 2/2007 | Chen et al. | 707/104.1 |
| 2007/0118667 A1* | 5/2007 | McCarthy | H04L 29/12066 709/238 |
| 2007/0118668 A1* | 5/2007 | McCarthy | G06F 17/30902 709/238 |
| 2007/0217419 A1* | 9/2007 | Vasseur | 370/392 |

(Continued)

OTHER PUBLICATIONS

Jussi Kangasharju, James Roberts, Keith W. Ross "Object replication strategies in content distribution networks" 2002, Computer Communications 25 (2002) 376-383.*

*Primary Examiner* — Ninos Donabed
(74) *Attorney, Agent, or Firm* — Stewart M. Wiener

(57) ABSTRACT

Methods, systems, and apparatuses can provide a pooling architecture for video servers and network resources. The pooling architecture can be based upon allocating content object copies to two or more nodes, intelligently selecting a primary streaming resource and a failover streaming resource, and identifying and compensating for exception asymmetries in system resource demand.

16 Claims, 8 Drawing Sheets

(56) References Cited

U.S. PATENT DOCUMENTS

| | | | | |
|---|---|---|---|---|
| 2008/0034268 A1* | 2/2008 | Dodd | ................ | H03M 7/30 |
| | | | | 714/755 |
| 2009/0019535 A1* | 1/2009 | Mishra | ................ | G06Q 10/00 |
| | | | | 726/12 |
| 2009/0119729 A1* | 5/2009 | Periman | ................ | A63F 13/335 |
| | | | | 725/114 |
| 2009/0119738 A1* | 5/2009 | Perlman | ................ | A63F 13/358 |
| | | | | 725/133 |
| 2009/0125967 A1* | 5/2009 | Perlman | ................ | A63F 13/497 |
| | | | | 725/133 |
| 2009/0138601 A1* | 5/2009 | Hebert et al. | ................ | 709/226 |
| 2009/0254952 A1* | 10/2009 | Sridhar | ................ | H04L 41/5012 |
| | | | | 725/92 |
| 2010/0082836 A1* | 4/2010 | Zhang | ................ | 709/232 |
| 2010/0095014 A1* | 4/2010 | Zuckerman et al. | ................ | 709/231 |
| 2010/0166058 A1* | 7/2010 | Perlman | ................ | A63F 13/12 |
| | | | | 375/240.02 |
| 2010/0166063 A1* | 7/2010 | Perlman | ................ | A63F 13/358 |
| | | | | 375/240.07 |
| 2010/0166064 A1* | 7/2010 | Perlman | ................ | H04N 19/65 |
| | | | | 375/240.07 |
| 2010/0166065 A1* | 7/2010 | Perlman | ................ | A63F 13/12 |
| | | | | 375/240.07 |
| 2010/0167809 A1* | 7/2010 | Perlman | ................ | A63F 13/12 |
| | | | | 463/24 |
| 2011/0105226 A1* | 5/2011 | Perlman | ................ | A63F 13/12 |
| | | | | 463/30 |
| 2011/0106950 A1* | 5/2011 | Schlack | ................ | G06F 11/2046 |
| | | | | 709/226 |
| 2011/0178831 A1* | 7/2011 | Ravichandran | ................ | G06Q 10/06 |
| | | | | 705/7.11 |
| 2011/0299853 A1* | 12/2011 | Zampetti | ................ | H04J 3/0667 |
| | | | | 398/98 |

* cited by examiner

LOAD SHARING AMONG LOOSELY COUPLED OR INDEPENDENT VIDEO SERVERS

CROSS-REFERENCE TO RELATED APPLICATIONS

This application is a non-provisional of and claims priority to the filing date of U.S. Provisional Patent Application Ser. No. 61/496,438, entitled "Load Sharing among Loosely Coupled or Independent Video Servers," filed Jun. 13, 2011, which is hereby incorporated by reference as if set forth herein in its entirety.

TECHNICAL FIELD

This disclosure relates to providing video to customer sites from loosely coupled or independent video servers.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types. The transport of data traffic has facilitated many so-called "over the top" video solutions whereby video travels to the user via the user's DOCSIS data connection. Further, the popularity and low cost of packet driven networks has driven many service operators (e.g., MSOs) to explore internet protocol driven television, known as IPTV.

Many of these solutions generally implicate a video on demand type architecture whereby content is stored in the cloud and is accessible by the user upon request. However, providing such content from the cloud can provide many challenges, including architecture, storage, network use, etc.

BRIEF DESCRIPTION OF THE DRAWINGS

Like reference numbers and designations in the various drawings indicate like elements.

DETAILED DESCRIPTION

In some implementations of this disclosure, systems and methods can operate to provide a node pooling architecture for load sharing among loosely coupled or independent video servers. The architecture can be based upon allocating content object copies to two or more nodes, intelligently selecting primary and failover streaming resources, identifying and compensating for exception asymmetries in system resource demand, and scaling the system resources based upon increased demand.

Figure 1:
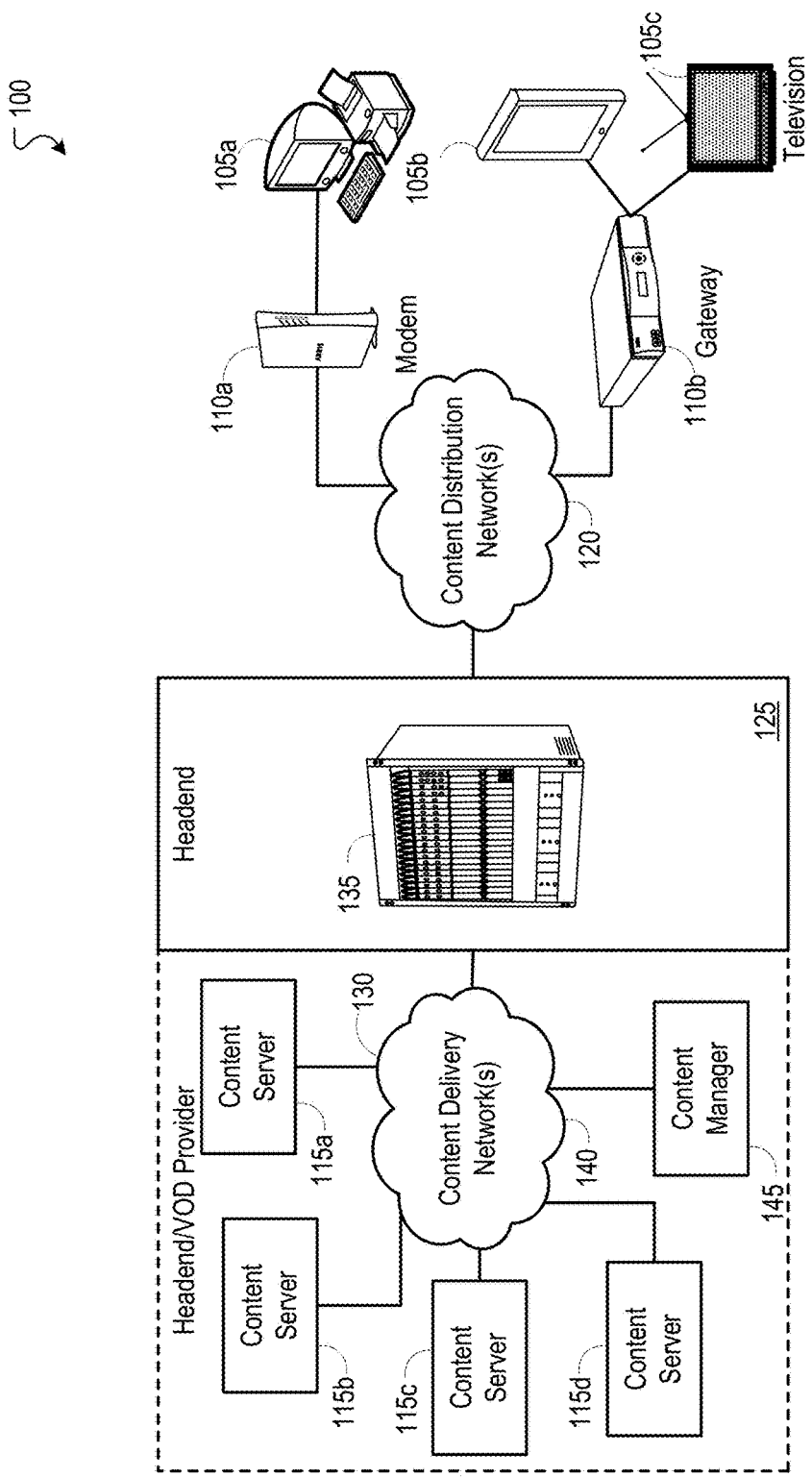
FIG. 1 is a block diagram illustrating an example network environment operable to provide a pooling architecture for video resources.

FIG. 1 is a block diagram illustrating a high-level broadband communications system for distributing videos from various video sources to various playback devices within a networked environment. One or more video playback devices 105a-c (such as an IP television 105c, mobile phone, tablet 105b, notebook, or computer 105a) can be connected to a modem 110a or gateway 110b, which is typically connected to an HFC network 120. Playback devices 105a-c can request a video from a content servers 115a-d by transmitting a request through the HFC network 120 to a headend 120. In some implementations, a headend can contain a cable modem termination system (CMTS) 135 and/or a quadrature amplitude modulator (QAM). It should be understood that the content servers 115a-d can represent a local content servers at the headend 125 or can be provided by a service external to the headend (e.g., across content delivery network 140). In some implementations, the video stored on the content servers 115a-d can be processed using either an MPEG-2 or an MPEG-4 coder-decoder (CODEC) to produce an MPEG transport stream. The MPEG transport stream can then transmitted by one or more of the content servers 115a-d, and the MPEG video can be transported (for example, in implementations where the content servers 115a-d are external to the headend 125) over the network 140 to a cable headend 125 and ultimately to the playback device 105a-c.

In the headend 125, HTTP packets containing the MPEG video can be received by a CMTS 135 device and converted to a video signal representing the video content, for example, for delivery over the content distribution network 120 (e.g., cable network). The video signal can then be combined with signals for other services (e.g., voice, non-video high-speed data) to produce a combined signal. The combined signal, which can include combined services, can be transmitted over the content distribution network 120 to a subscriber premise. In various implementations, the content distribution network 120 can take the form of an all-coax, all-fiber, or hybrid fiber/coax (HFC) network, for example, among many others.

At the subscriber premise, a combined signal representing the combined signal can be received by a cable modem (CM) 110a or gateway (GW) device 110b and can be delivered (e.g., wirelessly or wired) to the playback device 105a-c to process and display the video. Other services (such as high speed data, for example) included in the combined signal can be delivered to other CPE devices (such as a personal computer 105a).

At the subscriber premise, such as the subscriber premises having the playback device 105a-c, for example, the combined signal representing the combined signal can be received by CM/GW 110a-b and the stream representing the MPEG video can be delivered to the playback device 105a-c to process and display the video.

In some implementations, the content included within the content servers 115a-d can be managed by a content manager 145. The content manager can operate to allocate node capacity (e.g., capacity of the content servers 115a-d) to content objects. In various implementations, the allocation can be based on a best-fit, random, or hybrid allocation process. The content manager 145 can also operate to select nodes for streaming and failover based upon requests received from any of the content playback devices 105*a-c*. In some implementations, the content manager 145 can also identify instances of exceptional asymmetries in content allocation and/or use of streaming resources and demand for scaling the allocated resources. These processes will be described in more detail below.

In some implementations, the architectural scope of this disclosure uses a "server pool" approach to video delivery. In such architectures, the server pool can be a viewed as a collection of loosely-coupled, semi-independent servers in a common network, with common reach-ability to video subscribers. The servers can be "nodes" of an interconnected content delivery system. Both the available video content and the streaming load can be distributed across the nodes.

The server pool architecture can borrow the following principles from Cloud Computing:

Shared resource pooling for increased utilization and efficiency

Reliability by distributing load across multiple hardware instances and eliminating single points of failure Scalability by enabling capacity expansions through server instance additions without service disruption Maintainability by enabling upgrades and hardware maintenance without service disruption While the descriptions and analysis in the sections below refer to "content" in general and thus seem to imply a stand-alone content library, a la CDN origin server, these concepts are equally applicable to a pool of cache content nodes. The scalability, redundancy, storage efficiency, and load-balancing efficiency of this solution can serve to optimize the cost-performance and operational efficiency of any appropriate location of a CDN, including the origin server, caching edge sites, or mid-tier caching or library sites. For simplicity of description and analysis, generic references to "content" and "objects" are used, with little mention of caching. However, near the end of the paper, after the core analysis sections, a "Caching Model" section describes methods for mapping these concepts onto a pull-thru cache pool.

Some general ideas that can be attributed to implementations of a server pool architecture can include:

Virtualization—multiple nodes appear, and work together, as one. This can apply to the content, whether as a library or as an aggregated cache, as well as the streaming resources and the node pool network as a whole. The pool concept can be especially well-suited for exploiting shared end-user connectivity and pooled resources to efficiently aggregate and amplify the unified cache performance. All nodes in the pool can have shared affinity with, or common reach-ability to, the virtualization—multiple nodes appear, and work together, as one. This can apply to the content, whether as a library or as an aggregated cache, as well as the streaming resources and the node pool network as a whole. Policies designed to ensure maximum content heterogeneity across multiple servers' caches can drastically increase effectiveness of the aggregate cache, thus positively affecting cache hit performance at the edge and reducing traffic in the network. Once the algorithms are in place to facilitate the organic management of the pool servers' resources, the aforementioned policies can be easy to implement.

Network and storage tradeoffs—inter-node communication, hierarchical network loads, and content propagation can all be reduced by judicial provisioning of additional content storage.

Commercial off-the-shelf (COTS)—in support of the need for easy and large-scale modular resource scaling, using inexpensive and ubiquitous modules, the hardware server platform and underlying system software elements (OS) can be assumed to be COTS and the network elements can be standard commodity Ethernet devices. Furthermore, this COTS foundation encourages and enables the development of hardware-independent value-add software to implement the concepts introduced in this paper.

Architectural Considerations

Some architectural considerations can be established to provide positive network characteristics, including:

Balance—Streaming loads can be balanced according to the capacities (content and streaming) of the various nodes. Rules and algorithms can be established for provisioning nodes and resources, allocating content objects to nodes, and directing streams to nodes. Inter-node content movement to correct imbalances can be kept to a minimum.

Scaling—Configure, scale-up, and upgrade overall capacities with minimum disruption to system operation. Establish policies and guidelines for adding nodes & capacity.

Redundancy—Maintain services at rated capacities even in the face of a node failure. Establish redundancy methods to fail-over lost content & streaming. Ensure:

Continued accessibility to all content titles

Continued full rated streaming capacity

In the case of a failed node in a caching pool, minimal network traffic devoted to content re-acquisition from the CDN origin server With these considerations in mind, some architectural elements are proposed to enable pool-based video delivery.

General Approach

Redundancy can imply that full rated streaming capacity and continued access be provided to all content in the face of an off-line node (e.g., n+1 redundancy). Such architectures can share similar goals to other redundant array of independent nodes (RAIN) architectures. This can implicate some implementation details, including:

Storing two or more copies of every video content object, with the copies on different nodes. Provision storage for this extra content. Dual-copy content allocation strategies are further described in the next section below, "Allocating Content". It should be recognized here that, in the case of a caching pool, policies can be applied that dynamically vary the level of redundancy across the objects, some with no copies or one copy (relying on the origin server for backup) and some with two or more, depending on the popularity or streaming load of the object (see the Caching Model section below).

Provisioning for video streaming capacity across the system to absorb one node going totally off-line. The streaming capacity of a node can be de-rated to account for the failover streaming capacity that can be reserved in case one of the other nodes fails. Thus, to cover the potential loss of one node, the streaming capacity of n+1 nodes can provide an effective streaming capacity of n nodes. Capacity de-rating strategies and equations are described in the "Directing Streams" section below.

When a stream is requested, the request can be directed to one of the nodes that has a copy of the requested object. An equivalent streaming load can be provisionally reserved at one of the other copies, accounting for node failover coverage. Selection of the streaming and failover nodes can consider the current streaming loads and provisional failover streaming reservations of the set of nodes with copies of the object. Stream-direction (node-selection) algorithms will be discussed below.

Allocating Content

In some implementations of this architecture, content allocation can entail replicating a content object on two nodes, being prepared to add a third copy dynamically based on demand. This approach can be in essence a heterogeneous distribution with limited replication, thereby forming a synergy of network and storage resources. Total provisioned storage can be effectively 2× rated content size, which can be treated as a floor for failover redundancy. One could extend this to the extreme and put a copy of all objects on all nodes (e.g., full content replication). This can increase flexibility and simplicity in stream allocation and failover, as well as the ability to absorb streaming load asymmetries by stream direction only, but would involve significantly more storage, especially as the pool's node count increases.

Figure 2A:
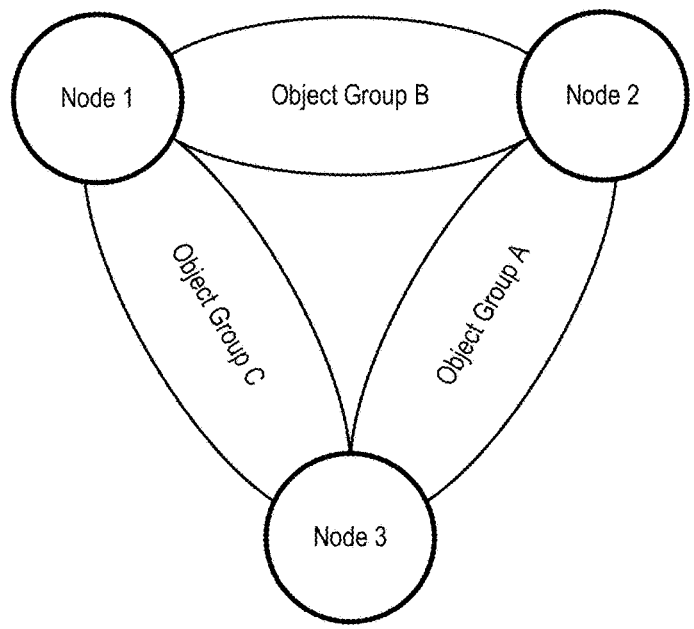
FIGS. 2A-B are block diagrams illustrating an example of network nodes and object groups shared between the network nodes in a two-copy pooling system.
Figure 2B:
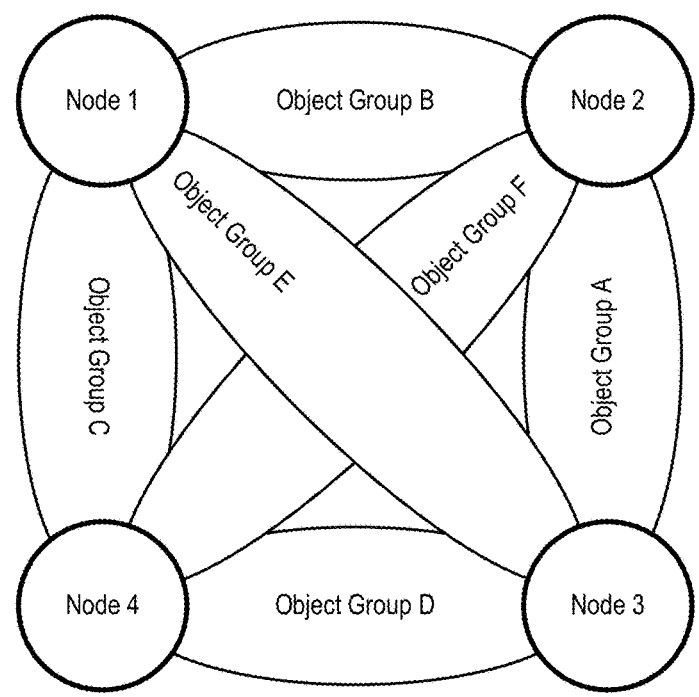

So, assuming only two copies per object, an object can belong to a specific content node pairing or "object group," which can include of all the objects whose two copies are allocated to the same pair of nodes. An object can belong to one object group, and a node can intersect multiple object groups, one for each of the other nodes in the system. In a system of n nodes, there can be $n(n-1)/2$ object groups. In a graph of nodes, if one were to draw an arc between every pair of nodes, those arcs correspond to the object groups. This relationship is illustrated in FIG. 2.

Note that this object group concept can be extended to encompass a variety of node group sizings in the same system (see the "Exceptional Asymmetries" section for a description of 3-copy object groups). For now, the focus will remain on two-node object groups.

Content can be allocated across the nodes to balance storage capacity. Ideally, the nodes end up with nearly the same amount of stored content (weighted for relative capacities), and all the object groups will also be nearly equal in their storage allocation. An even allocation of content objects across the nodes can lay a foundation for stream allocation—a sea of object copy pairs spread randomly across the array of nodes, ready for a streaming load and failover reserve to be carefully mapped onto it in as balanced a way as possible. Content can be allocated in a way that distributes objects to storage in an apparently random way, without regard to expected popularity, and thus can naturally mix popular and less-popular objects within and among the object groups, increasing the opportunity to absorb streaming hot spots and balance loads using the redundant resources provided (redundancy expands choice and flexibility). In effect, randomized but even content allocation can operate to flatten the apparent content usage profile from the perspective of node and network utilization.

In various implementations of this disclosure, the problem of allocating redundant content for both random and even distribution can be solved in any of several ways.

One approach to content allocation is the "best-fit" approach. Using the best fit approach, a first copy of an asset is allocated to the node that is least-full (weighted by their relative capacities) and then a second copy is allocated in the same way (i.e. to the $2^{nd}$-least-full node). This approach can lead to patterns and asset pool "silos" (assets on a given node tend to be paired with copies on the same other node) that can result in imbalances in streaming loads, especially for systems with even numbers of nodes. Node pairings can overlap in a mixed-up random-appearing way in order to support a well-balanced streaming load, and this content allocation approach may not achieve that.

A modified version of the best-fit approach, can use best-fit to assign the first copies of content and then use best-fit to assign the second copies. This is a reasonable approach to take with the initial load of a large set of assets into storage, and subsequent loads of smaller sets of assets will be less likely to cause problems.

A third approach is to allocate first and second copies by selecting nodes at random (weighted according to relative capacity). However, it should be understood to avoid the pitfalls in the manner chosen to handle conflict cases (e.g., when the node selected for the first copy is the same as that selected for the second copy). Also, it should be noted that the resulting stored content may not be as evenly distributed across the nodes as the previous approaches. However, this imbalance is typically only a few percent or so.

A hybrid approach can randomly allocate the first copy then allocate the second copy using a best-fit approach. Such a hybrid allocation approach can avoid silo problems and can also result in an even distribution of storage capacity.

Another aspect of content allocation is content pre-placement. For the case of caching pools, pre-positioning of content may or may not be desirable or practical, depending on the specific design requirements of an implementation. Reductions in network loading have been shown to result from metadata-directed pre-placement of cache content. Regardless, one can pre-place none, some, or all of the content while following the allocation scheme mentioned above; subsequent new content can be allocated as it arrives in the same manner; or direct/re-direct streams for pull-thru to result in the same desired placements (more details on pull-thru approaches are given in the "Caching Model" section further below).

Directing Streams

Figure 3:
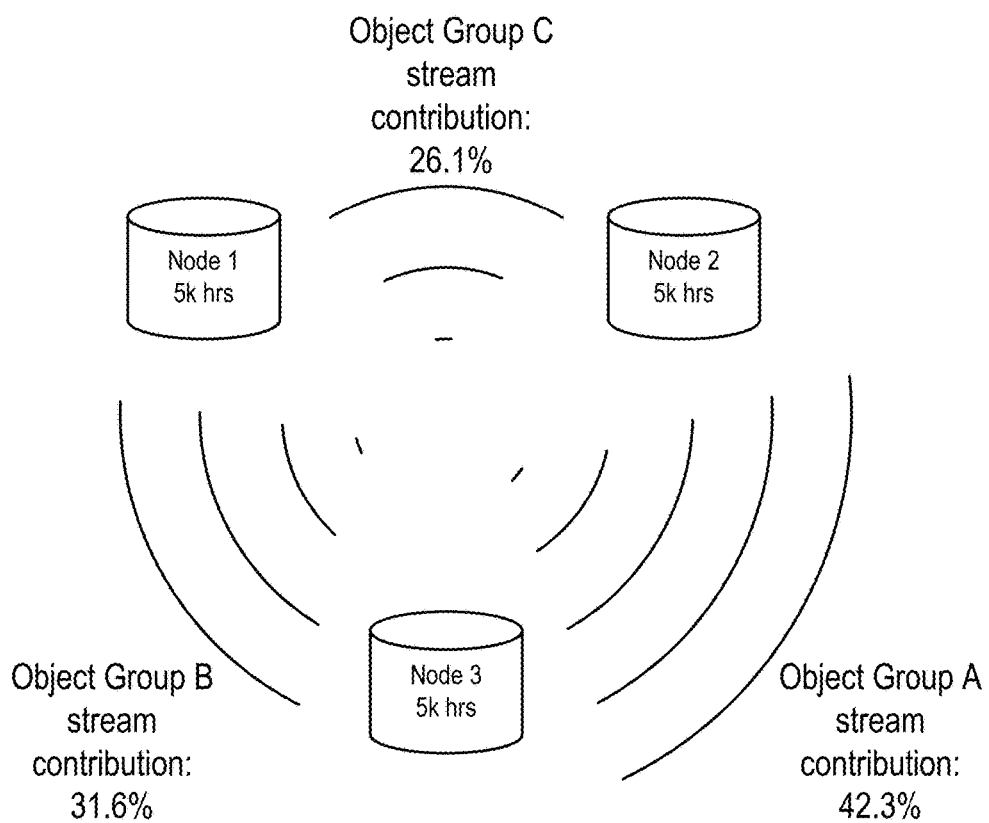
FIG. 3 is a block diagram illustrating an example showing asymmetry in network resource allocation.

Stream requests can be directed to nodes in such a way as to minimize the de-rating of system streaming capacity, which can more efficiently absorb the failover streaming load of an off-line node as well as asymmetries in streaming demand (e.g., popularity hot spots). Some examples of streaming load asymmetries are shown in the table and FIG. 3. The streaming load asymmetries can be expressed as the largest fraction of total system streams sourced from any object group (multiple "trials" are shown, in which the random elements of the content allocation mechanism are re-seeded). The data in the table was generated with simulations driven by real-world field data. More details on absorbing asymmetries are described below.

| Asymmetry-Largest streaming load on an object group | 3 nodes | 4 nodes | 8 nodes | 16 nodes |
|---|---|---|---|---|
| Ideal (perfectly balanced) | .333 | .167 | .036 | .0083 |
| Trial #1 | .363 | .210 | .103 | .059 |
| Trial #2 | .416 | .224 | .116 | .059 |
| Trial #3 | .383 | .208 | .085 | .056 |
| Trial #4 | .359 | .215 | .113 | .075 |
| Trial #5 | .423 | .211 | .086 | .073 |

When a new stream request occurs, a node can be selected to source the stream, and another node is selected to provisionally reserve failover resources for the stream. Both of these nodes have access to the content object requested and can reach the appropriate transport network with the stream. If content has been allocated in the manner described in the section above, there are two nodes with copies of the desired object, so selecting one node to source the stream automatically selects the other to provisionally reserve failover resources. Effectively, the requested object picks the node pair and the "stream director" can decide which node of the pair will source the stream and which will shadow the stream for fail-over. These two nodes together can uniquely describe the identity of the "object group" containing this object and others with their two copies on these same two nodes.

Since objects can be uniquely assigned to an object group, the streaming load allocated to the object group at any given time can be identified as the aggregated streaming load at that time of all the objects of the group. Additionally, an equivalent failover load can also be allocated to the group. More specifically, in some implementations, a portion of the object group's streaming load can be assigned to one of its associated nodes while the other portion can be assigned to the other node in the pairing. The associated failover loads can be apportioned to the opposite nodes of the pairing, so the total streaming-plus-potential-failover loads assigned from this object group to each of the two nodes hosting it can be equal.

Any particular node can be allocated content so as to intersect a number of object groups. Those intersecting groups can be uniquely associated with a node and one of the other nodes. Therefore, the set of object groups of one node can overlap exactly one group belonging to another node, while each node's set of object groups can be unique. Therefore, in some implementations, the total collection of object copies of one node can be allocated so as to be different than that of any other node. Likewise, the streaming loads and provisional failover loads of one node are unlikely to match those of another node.

The streaming capacity of a node can be sufficient to cover both its expected nominal streaming load and its worst-case allocated failover streaming load. At a given node and a given point in time, each of the object groups associated with that node can contribute to the node a portion of the current streaming load of the object group and a complementary (corresponding to the other portion of the object group's streaming load) potential failover load. The same object group can contribute the opposite loads to the other node associated with the object group. The worst-case total potential streaming load of a node at a given time can be the sum of the actual streaming loads allocated to that node from all the object groups for that node, plus the maximum of the potential failover streaming loads allocated to that node from its set of object groups. The maximum failover load from among the object groups can be used instead of the sum because only one of the nodes in the system can be expected to be off-line at any one time and the worst-case scenario for this node can be the failure of the complementary node of the object group that contributes the largest potential failover load to this node. So, for time t, the potential load l(t) at a node can be given by:

$$l(t) = \text{total\_allocated\_streaming}(t) + \text{max\_allocated\_failover}(t)$$

and the minimum streaming capacity that can be provisioned for that node can be the maximum l(t) over the lifetime of the node's current configuration. An example simple formula relating node capacity with the peak system streaming load and system size (node count) is described below with respect to absorbing asymmetries.

Other related algorithms that consider streaming loads, potential failover loads, nodes, and object groups can be used, and can meet objectives of optimum balance, optimum efficiency, minimum provisioning, and/or minimum content churn, etc. with varying degrees of success.

In some implementations, one objective in choosing one node over another to source a new stream can be to maintain a balanced maximum streaming load across the nodes of the system (e.g., to match a node's worst-case load against its relative streaming capacity in the system). Because the worst-case streaming load of a node, and thus in some implementations the required capacity, can be identified as the total current streaming load plus the maximum current potential failover reserve, this metric can be compared between implementations when selecting one node over another to direct a stream. Selecting a node to source a stream based solely on the current actual streaming load of the candidate nodes might not result in a balanced system and can lead to an off-balance system that does not fully fail-over the streaming load of a lost node. Nominal streaming loads can be balanced, but the maximum potential load (e.g. after failover) is not.

Figure 4A:
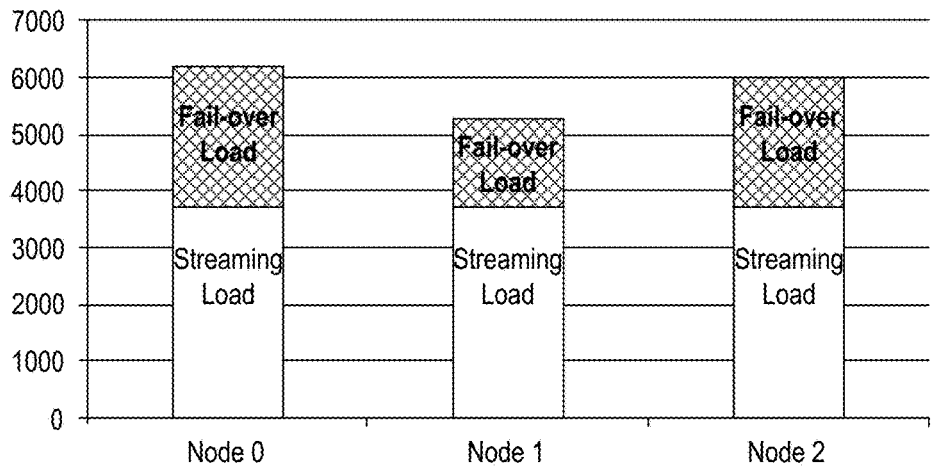
FIGS. 4A-B are graphs illustrating stream selection examples based on different loading paradigms.

The graphs shown in FIGS. 4A and B compare two approaches to balancing loads, one based on the current streaming loads and one based on both streaming and maximum failover loads. Results are depicted for a 3-node system, showing maximum streams and maximum streams+failover for all 3 nodes.

When only streaming loads are considered as shown in FIG. 4A, the resulting maximum streaming loads are well balanced, but the total load including failover are unbalanced and worst-case is quite high. When streaming+failover loads are considered, however, the streaming loads alone are unbalanced but the total load is balanced and lower. Thus, it should be appreciated that streaming load alone can mean nothing when maximum potential failover streaming is also being reserved.

When an object is identified to source a new stream, that stream can be assigned to one of the nodes of the pair associated with the requested object's two copies. The node selected to source the stream can be the node with the lowest current potential load, e.g., total streaming load plus maximum potential failover load, since the incremental streaming load can translate completely to additional load on a node, while the incremental potential failover load may or may not add to a node's maximum failover load (a node's potential failover load from this object group may not be the current maximum for the node). So, the stream can be directed to the node, of the pair, that has the lowest current potential load, and the failover role for the stream can be assigned to the other node of the pair.

Absorbing Asymmetries

The asymmetry introduced by node failover has been addressed by the object storage and stream load redundancies described above. By storing two copies of an object on different nodes and accounting for failover streaming loads when de-rating a node's capacity and when assigning a stream, the possibility of a node failure can be provisioned for.

Figure 4B:
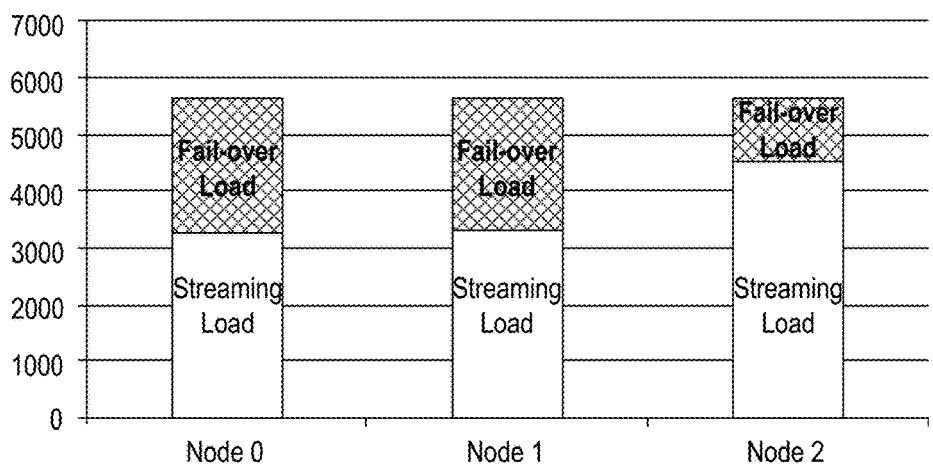

Note that the architecture's provisioning for content and streaming redundancy to cover a node failure can also provide natural flexibility in stream allocation to support efforts to balance uneven streaming loads across nodes and object groups. Under most conditions, rules guiding content replication and the over-provisioning of streaming capacity can operate to maintain balance in the face of dynamic load asymmetries (shifting popularity profiles) as well as to absorb a node fail-over, without having to move or adjust content. This has been verified by analysis and by simulation driven by real-world field data (as shown in FIGS. 4A-B).

In a system in which content objects and streams are allocated as described above, and given a peak total streaming load "S," the maximum streaming+failover load experienced by any of the nodes can nominally be $1/(n-1)*S$ (this equation represents the system streaming load spread across all the nodes but one possibly failed node; this is the de-rated capacity of a node). This per-node maximum can hold for a range of streaming load asymmetries described as follows: if each node of a system is provisioned to support at least $1/(n-1)*S$ streams, and the worst-case streaming demand on any object group of the system is less than $1/(n-1)*S$, the nodes can fully absorb the streaming load as well as the failover load of any node failure. The determination of this upper limit to object group streaming load is based on the observation that each node of a pair can absorb the full streaming load of their associated object group because the group's streaming+provisional_failover load can be double the streaming load and can be evenly allocated to the two nodes. A streaming load, on an object group, greater than the capacity of either of its paired nodes might not be absorbed by the nodes. Note that a perfectly even distribution of streaming load would allocate $2/(n(n-1))*S$ streams to each object group (there are $n(n-1)/2$ object groups (node pairings) in a system of n nodes). Thus, the maximum absorbable object group load can be n/2 times the perfectly even (ideally balanced) load. See the table below and FIGS. 5A-B for streaming load asymmetry ranges for various node counts.

| Number of nodes (n) | Number of object groups (arcs connecting node pairs): $2/(n(n-1))$ | Minimum Rated Node Capacity-fraction of system streams: $1/(n-1)$ | Range of allowable max streaming load per object group: $n(n-1)/2 - 1/(n-1)$ | Allowable/Ideal ratio: n/2 |
|---|---|---|---|---|
| 3  | 3   | 1/2  | 1/3-1/2     | 1.5 |
| 4  | 6   | 1/3  | 1/6-1/3     | 2.0 |
| 6  | 15  | 1/5  | 1/15-1/5    | 3.0 |
| 8  | 28  | 1/7  | 1/28-1/7    | 4.0 |
| 12 | 66  | 1/11 | 1/66-1/11   | 6.0 |
| 16 | 120 | 1/15 | 1/120-1/15  | 8.0 |

Simple n+1 provisioning, combined with two-copy content provisioning and efficient allocation, can be sufficient to absorb most practical asymmetrical situations if the stream direction algorithm is also effective (balance streams+max-failover).

Figure 5A:
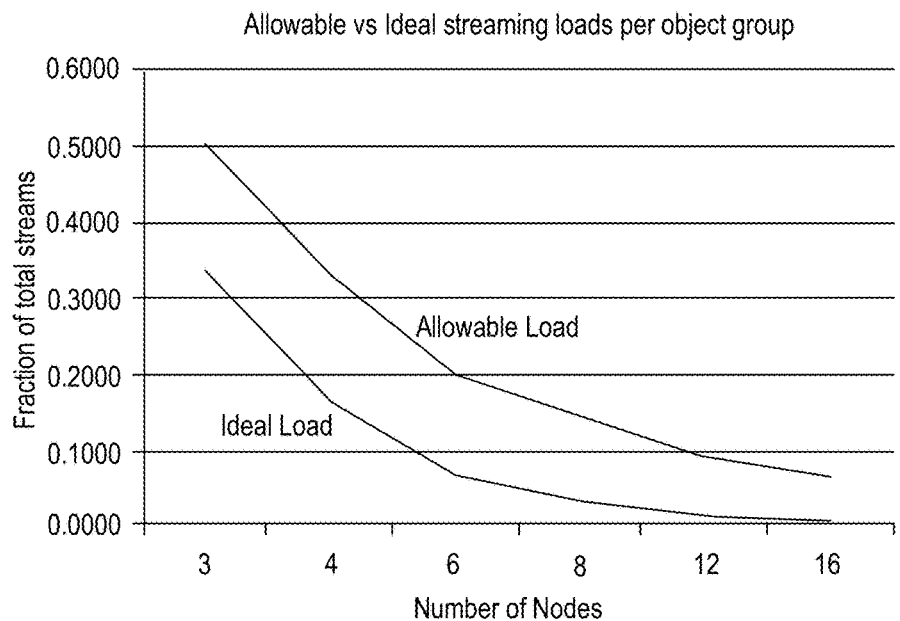
FIGS. 5A-B are graphs illustrating simulations of streaming loads according to this disclosure.
Figure 5B:
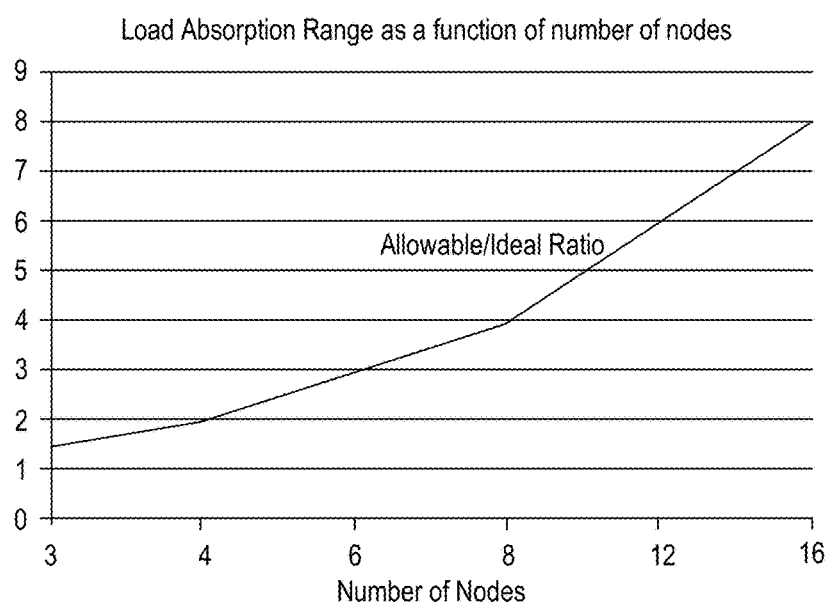
Figure 6:
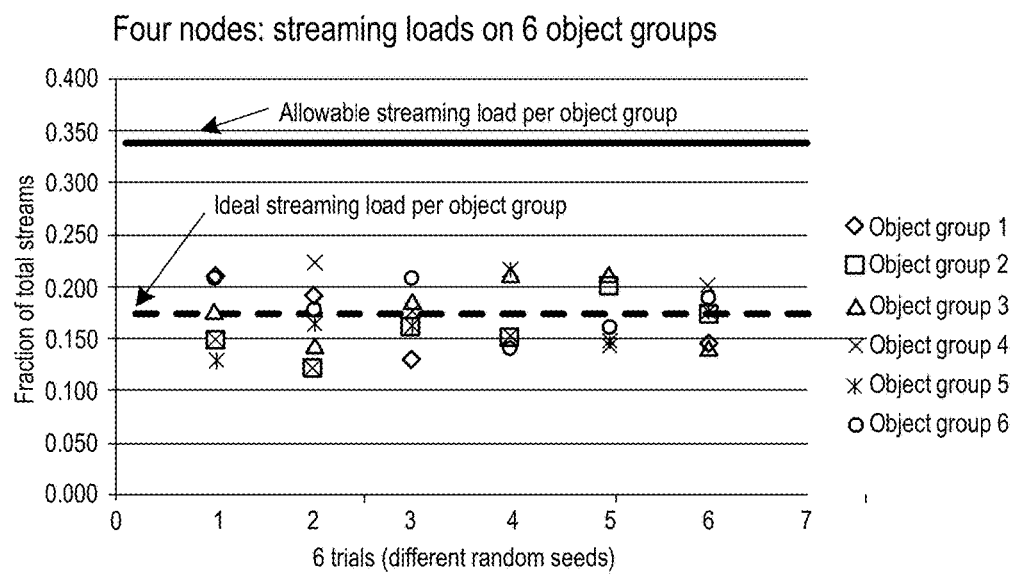
FIG. 6 is a graph illustrating simulated results of streaming loads based on six object groups.

Given the basic provisioning, a content allocator, and a stream director, the table above and FIGS. 5A-B show the theoretical bounds of asymmetry for various system sizes. FIG. 6 is a graph containing some examples of various load asymmetries, from simulation models driven by actual field data. FIG. 6 shows the streaming loads of the object groups of a 4-node system, these loads all clustered around the balanced load level and below the absorbable limit calculated above.

Normal everyday hot spots are generally exhibited by a group of popular objects that can be scattered randomly across the object groups and so can tend to exhibit themselves as minor imbalances in demand. Such minor imbalances can migrate over time, exhibiting normal fluctuations in user demand but staying within the absorption range defined above. However, shorter-term, faster-ramp and higher-magnitude spikes in demand for isolated objects can also occur. If these shorter term imbalances are not too severe and/or they occur while no nodes are off-line they can also generally be absorbed successfully.

The exceptional scenario can be the sudden demand for a highly-popular object that soaks up a significant fraction of total streaming capacity for some period of time. For example, the so-called "super bowl" scenario, especially if it's unplanned and unpredictable (unlike the actual Super Bowl which is planned and scheduled). Depending on the number of nodes in the system, an object group that suddenly accounts for $1/4^{th}$, $1/3^{rd}$, or $1/2$ of all streams because of one or two super-hot objects could exceed the bounds given in the table above. This is an example when dynamic propagation of extra object copies to other nodes can be used to mitigate the circumstances.

Note that based on the tables and figures discussed, although the ranges of relative allowable streaming asymmetry can be much higher for large node-count systems, the absolute maximum loads are smaller than for small node-count systems. Thus, as systems grow to higher and higher node counts, they can be more vulnerable to isolated highly-popular objects.

Those skilled in the art should also be aware that the inherent absorption range of the node pool can be expanded to virtually any reasonable level by further de-rating the streaming capacity of the nodes. Such de-rating provides an alternative that can be traded-off against more content redundancy (e.g., more copies to begin with or more extra-copy dynamic object propagations). Another alternative is to go the other direction and simply plan on absorbing a fixed but reduced level of asymmetric and/or failover loads, as a system's risk tolerance dictates, and accept that some capacity will be curtailed or provisioned as extra load on the origin server and the intervening network).

Exceptional Asymmetries

The system can be able to handle asymmetries that exceed de-rated capacities. As indicated above, the streaming load on an object group should not approach or exceed $1/(n-1)*S$. When imbalances or load fluctuations overtax an element of the existing configuration, dynamic adjustments can be made to rebalance the load. The approach taken in some implementations of the architectures disclosed herein is to dynamically propagate or pull-thru additional copies of the problematic object to nodes with unused content & streaming capacities.

Adding a third copy of an object can create an effective triangle of nodes and thus three node-pairings to which the object's streaming and provisional failover assignments can be made. This in effect creates a new object group of 3 nodes tiered above the two-node object groups triangulated by those nodes. It gives the stream director three possible node pairings from which to choose when assigning a new stream, rather than just one. The additional node pairs can be available to absorb the excess loads being experienced by the original two-copy object group.

To accommodate a three-copy capability, the nodes of the pool can be provisioned with a fractional increment of unallocated content storage. Exceptional asymmetries can be caused by just a few objects, so the incremental capacity is relatively small.

Scaling and Upgrading

A feature of a networked server pool architecture is the potential for easily scaling up or scaling down the server pool resources by adding or removing nodes or modules. This scalability can ease the operational load and costs of system capacity upgrades and maintenance, with relatively low disruption to active operations.

The content allocation methods described earlier in this disclosure can continue to be used until a node fills its storage or takes capacity from $3^{rd}$-copy reserve. If storage is full or near full, additional storage can be added to the system. In some implementations incremental storage, e.g., independent storage volumes or shelves, can be added to each node or a subset of nodes. In other implementations, incremental storage can be added by inserting additional node(s) into the network. In these implementations, new storage capacity can be evenly and smoothly integrated into the system by, for example, randomly selecting existing object copies to be migrated to the new storage, and disabling the old copy from further stream allocation and ultimately deleting it. This can continue until the storage utilization is once again even (by weight) across the volumes.

To add streaming capacity, it can be easier to add standard nodes to the pool than to add CPU and I/O capacity to a node. However, it should be understood that all implementations are intended to be included within the scope of this disclosure.

While arbitrary resource asymmetries cannot always be well-balanced or efficiently exploited, systems can be incrementally scaled-up with nodes that are provisioned with resource capacities different from those of the original nodes.

Caching Model

The node pooling architectures disclosed herein can be applied to a cache pool as well as it can to a content library pool. For example, in a pool of pull-thru cache nodes, cache content can be provisionally allocated by directing a primary stream pull-through at one node and a secondary pull-through (for potential failover coverage) at another, thereby letting the cache logic and state of the individual nodes determine whether and how long the content stays in the cache. The stream's failover node can do everything the streaming node does, including provisionally reserving the streaming bandwidth, except to stream the content. Future stream requests for the same object can be directed at the same pair of nodes with both nodes hitting and/or updating their caches accordingly and one being chosen to stream while the other provisionally reserves bandwidth for failover.

While some objects can consume storage space in two caches, this is a redundancy provided by the disciplined content allocation mechanism. If the streaming activity of an object is sufficient to cause it to naturally hold a place in the two caches, the potential impulse load on the network and other nodes caused by a failed node can be reduced, since another copy of the object is already cached. On the other hand, the limited redundancy approach of the content allocation scheme can maximize the uniqueness and heterogeneity of content across the caches, thus improving the cache efficiency of the server pool over ad-hoc methods that allow caches to all pull from the same large library.

Note that policies may be applied that vary the level of redundancy across content objects, some with no copies or one copy (relying on the origin server for backup) and some with two or more, depending on the popularity or streaming load of the object.

Another approach can initially assign a single node (and provisionally its cache) to an object and its associated streaming load, until the demand for that object warrants an additional caching node to offset the load and provide valuable failover capacity. This approach to offset load can also be coupled with the goal of avoiding an impulse load on the other nodes and the upstream network if a node fails.

Figure 7:
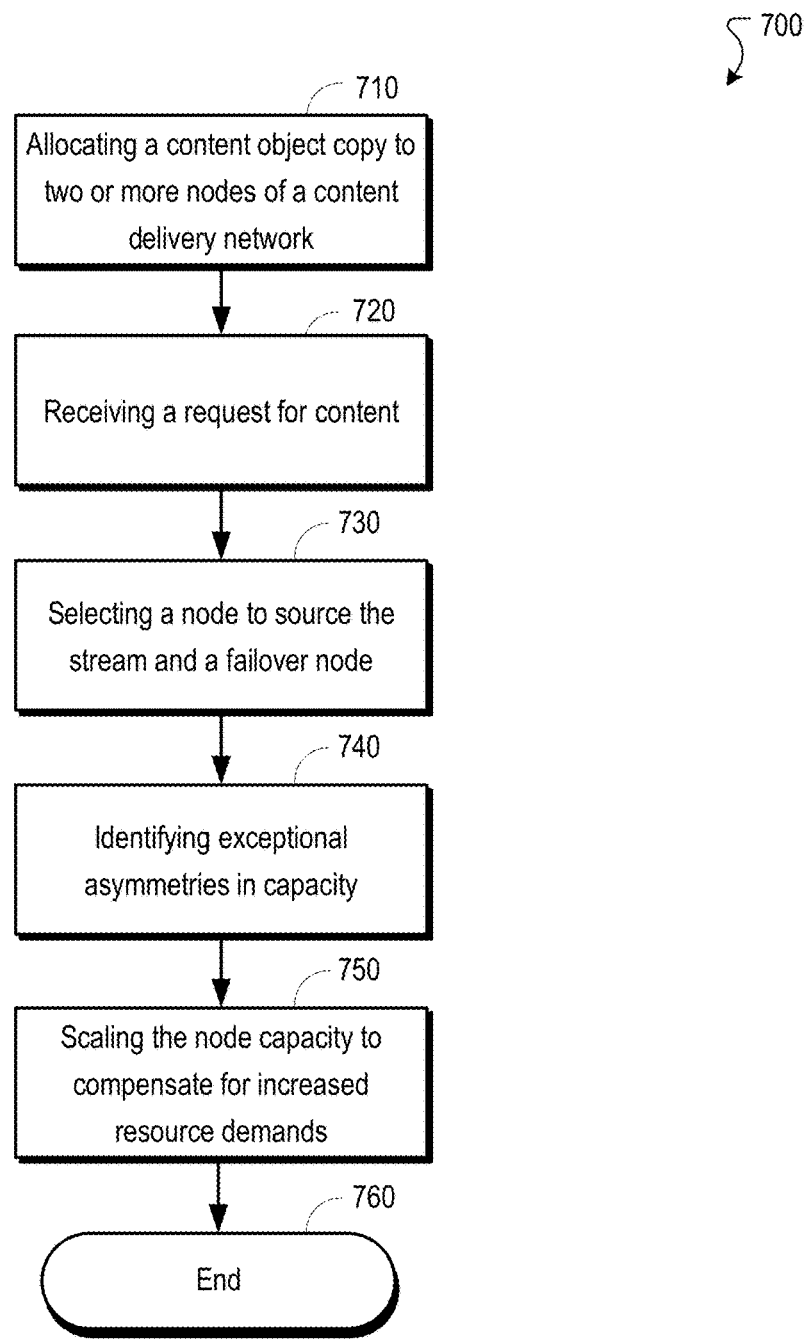
FIG. 7 is a flowchart illustrating an example operational scenario for a resource pooling architecture.

FIG. 7 is a flowchart illustrating an example process 700 for a resource pooling architecture. The process 700 begins at stage 710, where content is allocated to two or more nodes of a content delivery network. The content can be allocated, for example, by a content allocator (e.g., content manager 145 of FIG. 1). The content can be allocated to nodes based upon a best-fit, modified best-fit, random content allocation model, or combinations thereof. A goal of the content allocation can be to provide an even distribution of content across nodes of the pool architecture. In some implementations, the content allocator can be separate from other content management functionality.

At stage 720, a request for content is received. The request for content can be received, for example, by a session manager (e.g., content manager 145 of FIG. 1). The content request can be received from a playback device (e.g., playback device 105 of FIG. 1). While the session management is shown in this example as being co-located with the content manager, in some implementations, the session manager can be separate from other content management functionality.

At stage 730, a node is selected to source the stream. The selection can be made, for example, by a session manager (e.g., content manager 145 of FIG. 1). The selection can be made based upon a worst case scenario for the load. The worst case scenario can be identified, for example, based on a current streaming load and a maximum failover load associated with the node.

At stage 740, exception asymmetries are identified. Exceptional asymmetries can be identified, for example, by a content management system (e.g., content management system 145 of FIG. 1). Exceptional asymmetries can be identified as those asymmetries in resource demand that are sporadic and/or unexpected. Short term resolutions to these asymmetries can be handled by assigning extra resources (e.g., instantiating an extra copy of a content object).

At stage 750, the node capacity can be scaled to compensate for increased resource demands. Node capacity can be scaled, for example, by a system operator (e.g., multiple service operator or video on demand service operator). In some implementations, a content manager can identify increased demand and automatically relocate nodes for use in the pool. The process 700 ends at stage 760.

Figure 8:
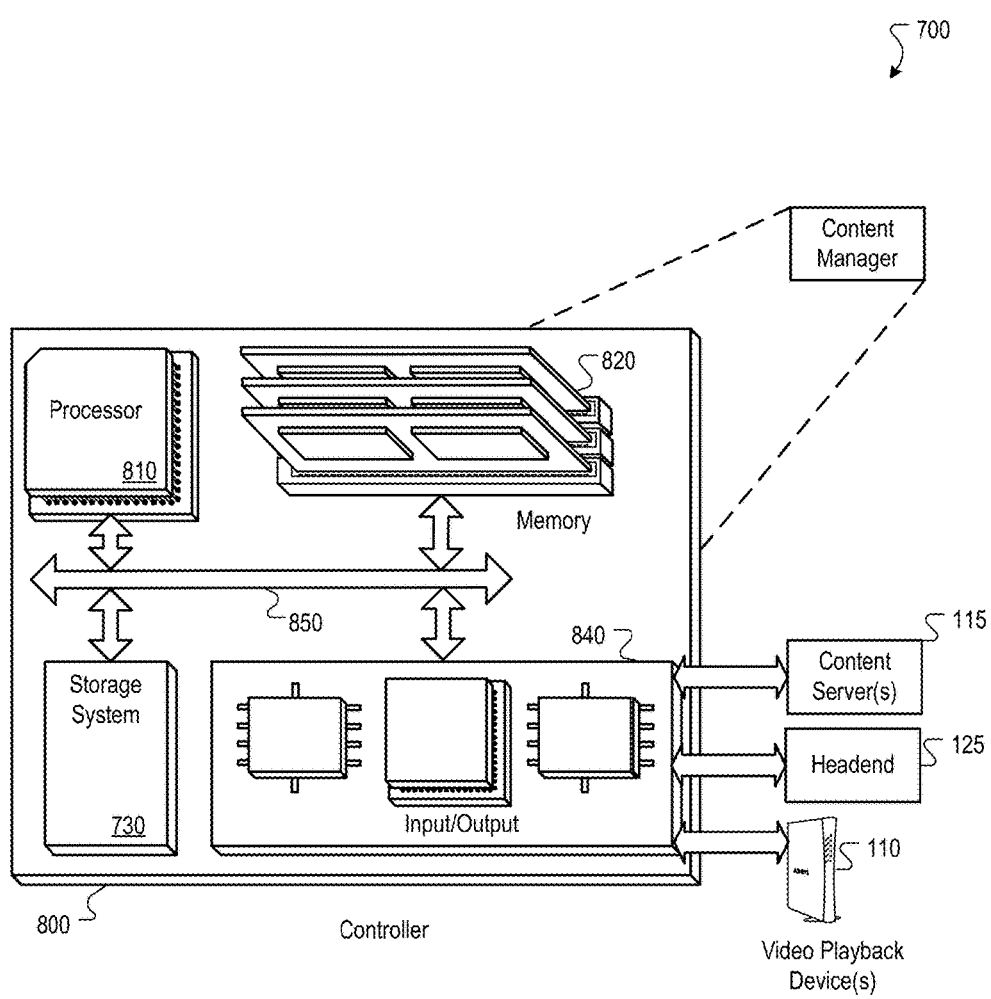
FIG. 8 is a block diagram of an example content manager operable to manage pooling resources.

FIG. 8 is a block diagram of an example content manager operable to provide load sharing among video servers in a node pooling architecture. However, it should be understood that many different kinds of network devices can implement a content management system. The content manager 800 can include a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 620 or on the storage device 830.

The memory 820 stores information within the content manager 800. In one implementation, the memory 820 is a computer-readable medium. In one implementation, the memory 820 is a volatile memory unit. In another implementation, the memory 820 is a non-volatile memory unit.

In some implementations, the storage device 830 is capable of providing mass storage for the content manager 800. In one implementation, the storage device 830 is a computer-readable medium. In various different implementations, the storage device 830 can, for example, include a hard disk device, an optical disk device, flash memory or some other large capacity storage device.

The input/output device 840 provides input/output operations for the content manager 800. In some implementations, the input/output device 840 can include one or more of a plain old telephone interface (e.g., an RJ11 connector), a network interface device, e.g., an Ethernet card, a serial communication device, e.g., and RS-232 port, and/or a wireless interface device, e.g., and 802.11 card. In additional and/or other implementations, the input/output device can include driver devices configured to receive input data and send output data to other input/output devices, such as one or more video playback devices 110 (e.g., set top box, cable modem, etc.), as well as sending communications to, and receiving communications from content server(s) 115 or a headend 125. Other implementations, however, can also be used, such as mobile computing devices, mobile communication devices, set-top box television client devices, etc.

The node pooling architecture of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method for allocating resources, comprising:
    providing a plurality of network video servers operating as nodes within a network and are operable to serve streaming video content to playback devices;
    allocating a content object copy to two or more network video servers from the plurality of network video servers, the two or more network video servers comprising an object group associated with the content object copy, wherein a content object copy is allocated to and stored at each of the two or more network video servers before identifying an exceptional asymmetry with regard to a demand for the content object copy;
    receiving a request for the content object copy;
    responsive to the request for the content object copy selecting a primary node to source the stream and a failover node to provisionally reserve failover capacity for redundancy, the primary and failover nodes being selected from the object group; and
    identifying an exceptional asymmetry in capacity, wherein the exceptional asymmetry is identified with regard to the demand for the content object copy by determining that one or more increases in the demand for the content object copy have consumed at least a threshold share of total streaming capacity;
    allocating one or more additional content object copies to compensate for the exceptional asymmetry; and
    allocating a plurality of content objects to the plurality of network video servers so as to intersect a number of different object groups, wherein the intersecting groups can be uniquely associated with a network video server and one of the other network video servers, thereby providing that a set of object groups associated with any network video server in the plurality of network video servers overlap exactly one group belonging to another network video server, while each set of object groups associated with a network video server are unique.

2. The computer-implemented method of claim 1, further comprising:
    allocating the content object copy to two or more network video servers based on a best-fit content allocation model.

3. The computer-implemented method of claim 1, further comprising:
    allocating the content object copy to two or more network video servers based on a random content allocation model.

4. The computer-implemented method of claim 1, further comprising:
    allocating the content object copy to two or more network video servers based on hybrid content allocation model using a best-fit content allocation component and a random content allocation component.

5. The computer-implemented method of claim 1, wherein a collection of object copies of one network video server are allocated so as to be different than collections of object copies associated with any other network video server.

6. The computer-implemented method of claim 1, further comprising selecting a primary network video server to source a new stream is based on maintaining a balanced maximum streaming load across the plurality of network video servers.

7. The computer-implemented method of claim 6, wherein a worst case scenario for a load associated with a network video server is matched to a relative streaming capacity associated with the network video server.

8. The computer-implemented method of claim 7, wherein the worst case scenario for the load is identified based on a current streaming load and a maximum failover load associated with the network video server.

9. A resource pooling system, comprising:
    a plurality of network video servers operating as nodes within a network, the plurality of network video servers being operable to serve video content to playback devices;
    at least one processor, communicatively coupled to the network, configured to provide a content manager operable to allocate a content object copy to two or more network video servers from the plurality of network video servers, the two or more network video servers comprising an object group associated with the content object copy, wherein a content object copy is allocated to each of the two or more network video servers before identifying an exceptional asymmetry with regard to a demand for the content object copy; and
    wherein, responsive to a request for the content object copy, the content manager is further operable to select a primary node to source the stream and a failover node to provisionally reserve failover capacity for the stream, the primary and failover nodes being selected from the object group;

wherein the content manager is further operable to identify an exceptional asymmetry in capacity and to allocate one or more additional content object copies to compensate for the exceptional asymmetry, wherein the exceptional asymmetry is identified with regard to the demand for the content object copy by determining that one or more increases in the demand for the content object copy have consumed at least a threshold share of total streaming capacity; and wherein the content manager is operable to allocate a plurality of content objects to the network video servers so as to intersect each content object to a number of different object groups, and further wherein the intersecting groups can be uniquely associated with a network video server and one of the other network video servers, thereby providing that a set of object groups associated with any network video server in the plurality overlap exactly one group belonging to another node, while each set of object groups associated with a network video server are unique.

10. The system of claim 9, wherein the content manager is operable to allocate the content object copy to the two or more network video servers based on a best-fit content allocation model.

11. The system of claim 9, wherein the content manager is operable to allocate the content object copy to two or more network video servers based on a random content allocation model.

12. The system of claim 9, wherein the content manager is operable to allocate the content object copy to the two or more network video servers based on hybrid content allocation model using a best-fit content allocation component and a random content allocation component.

13. The system of claim 9, wherein a collection of object copies of one network video server from the plurality of network video servers are allocated so as to be different than collections of object copies associated with any other network video server.

14. The system of claim 9, wherein the content manager is operable to select a primary network video server to source a new stream is based on maintaining a balanced maximum streaming load across the plurality of network video servers.

15. The system of claim 9, wherein a worst case scenario for a load associated with a plurality of video servers is matched to a relative streaming capacity associated with the network video server.

16. The system of claim 9, wherein the worst case scenario for the load is identified based on a current streaming load and a maximum failover load associated with the network video server.

* * * * *